United States Patent [19]
Lowe

[11] 3,963,936
[45] June 15, 1976

[54] NEUTRONIC REACTOR THERMAL SHIELD
[75] Inventor: Paul E. Lowe, Blue Ash, Ohio
[73] Assignee: The United States of America as represented by the United States Energy Research and Development Administration, Washington, D.C.
[22] Filed: Mar. 14, 1955
[21] Appl. No.: 494,298

[52] U.S. Cl. .............................. 250/517; 176/87; 176/DIG. 2; 52/573; 220/5 A
[51] Int. Cl.² .......................................... G21F 3/04
[58] Field of Search ............... 204/154.2; 250/108, 250/517; 176/87, DIG. 2; 220/5 A, 63 R; 52/573

[56] References Cited
UNITED STATES PATENTS
2,853,624 9/1958 Wigner et al. ................ 250/517 X
2,854,842 10/1958 Hosbein et al. ............... 250/517 X Primary Examiner—Stephen C. Bentley
Assistant Examiner—Peter A. Nelson
Attorney, Agent, or Firm—Dean E. Carlson; Arthur A. Churm; Robert L. Slater, Jr.

[57] ABSTRACT

A shield for a nuclear reactor includes at least two layers of alternating wide and narrow rectangular blocks so arranged that the spaces between blocks in adjacent layers are out of registry, each block having an opening therein equally spaced from the sides of the blocks and nearer the top of the block than the bottom, the distance from the top of the block to the opening in one layer being different from this distance in adjacent layers, openings in blocks in adjacent layers being in registry.

1 Claim, 7 Drawing Figures

INVENTOR.
Paul E. Lowe
BY
Roland G. Anderson
Attorney

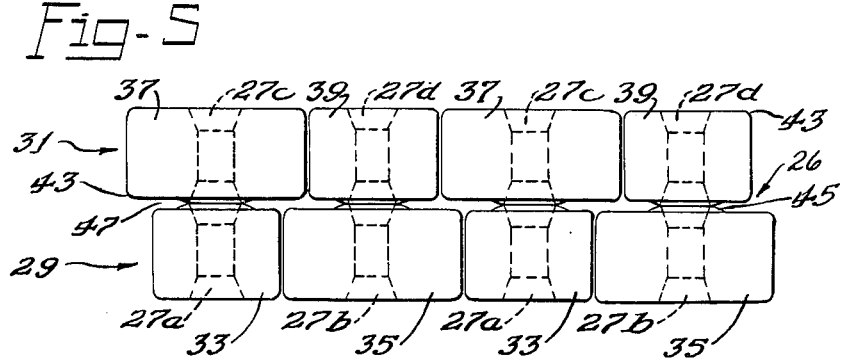
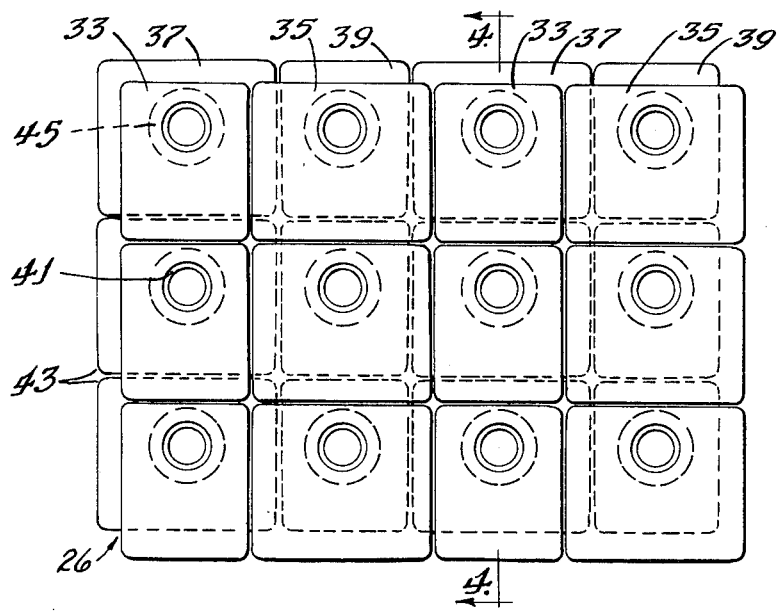
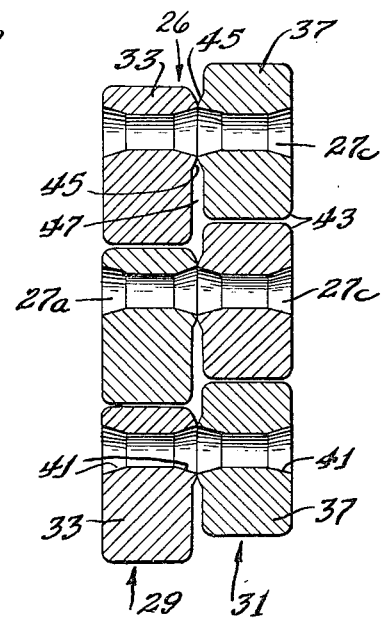
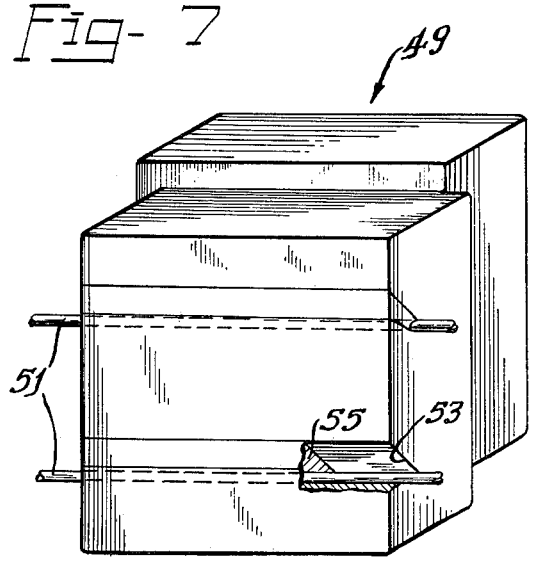
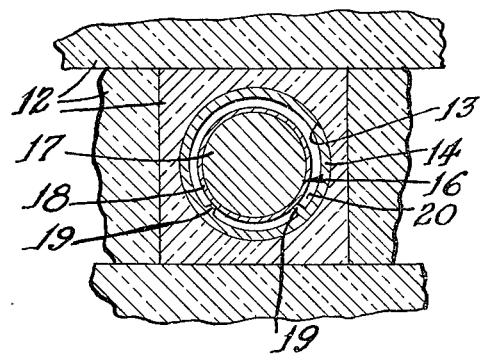
INVENTOR.
Paul E. Lowe

NEUTRONIC REACTOR THERMAL SHIELD

This invention relates to neutronic reactor radiation shielding devices and more particularly to radiation shielding devices that are adaptable for use with fluid cooled neutronic reactors.

In the operation of neutronic reactors, fissionable material, such as $U^{233}$, $U^{235}$, $94^{239}$, or mixtures of the like, is subjected to fission by absorption of thermal neutrons. In general, heterogeneous thermal neutronic reactors comprise bodies of material fissionable by thermal neutrons disposed in a moderating material. The moderating material has the property of reducing neutron kinetic energy without appreciably attenuating the density of the neutron flux emanating from the fissioning materials. A moderator thermalizes the neutrons, that is, it reduces the neutrons to a state of thermal energy whereupon they re-enter the nuclei of the fissionable material with a greater probability of producing fission than high energy neutrons. Typical moderating materials are carbon in the form of graphite, heavy water ($D_2O$), beryllium, and light water ($H_2O$).

When the fission process is induced under proper circumstances in material fissionable by thermal neutrons, more neutrons are released by the fission than are required to start the fission process. Under these circumstances a self-perpetuating chain reaction may be established. Specific details of the theory and essential characteristics of such reactors are set forth in Fermi et al U.S. Pat. No. 2,708,656, dated May 17, 1955.

In the operation of a neutronic reactor a large quantity of neutron, gamma, and other particulate and electromagnetic radiation is released. It is essential that means to retard this radiation and protect personnel and equipment in the vicinity of the reactor from excessive exposure be installed. The physical properties required to be present in a material which will attenuate and extinguish the full spectrum of radiation and particles streaming out of the active portion of a neutronic reactor in operation are many and varied. As a practical matter, no single material will serve to attenuate and extinguish particulate and electromagnetic radiation across the entire energy spectrum. As a consequence, all complete radiation shields are an engineering compromise and characteristically are composed of a variety of materials arranged in a geometrical relationship to maximize the utilization of certain properties of the shielding material with respect to radiation within limited regions of the energy spectrum. Restated in terms of the physical parameters of the shielding material, it may be said that shielding materials differ radically in absorption characteristics with respect both to the energy and character of incident radiation, and that radiation shields are designed with cognizance of these parameters. Accordingly the shielding structure about a neutronic reactor may be conveniently divided into two regions. The innermost portion of a shield is commonly termed a "thermal shield" and the outermost portion is commonly termed a "biological shield". The thermal shield, for reasons which will be stated below, is most preferably constructed of a very dense material, whereas the biological shield is preferably constructed in part at least of light materials.

A practical neutronic reactor must be equipped with an apparatus to control the rate of fission in the active portion of the reactor. One type of reactor control strategically locates neutron absorbing materials within the action portion of the reactor. Cadmium, boron, and certain other materials may be in the form of movably mounted rods which are readily adapted to insertion into and withdrawal from the vicinity of the fissioning material to make control and regulation of the neutron current density or neutron flux practical.

In addition to the fissionable material, moderator, control means, and shielding, a neutronic reactor must be equipped with means for carrying away the considerable amounts of thermal energy released by the fission process within the active portion of the reactor. These heat removal means may be conveniently take the form of a plurality of parallel tubes passing through the reactor from a front face to the opposite or rear face. A cooling fluid may then be pumped through the parallel tubes which will remove the heat released in the active portion of the reactor.

A neutronic reactor is customarily operated at a heat energy intensity of many hundreds of degrees (Fahrenheit). Consequently the cooling tubes passing through a reactor are heated intensely and caused to undergo thermal expansion which in turn causes buckling and rotational movements of the tubes, and slight movement of the tubes with respect to one another. Any movement of the reactor cooling tubes complicates the task of devising a radiation shield which provides facilities for readily supplying coolant fluid to the tubes yet is free from "windows" or small openings which permit the escape of harmful radiation.

It is an object of the invention, therefore, to provide a neutronic reactor having a shield that will protect personnel and equipment in the vicinity of the reactor from radiation and at the same time provide a degree of freedom for the neutronic reactor cooling tubes passing through the shielding.

Another object of this invention is to provide a thermal shield for a neutronic reactor which is not unfavorably affected by the heat of the reactor and is adaptable to withstanding the thermal stress induced by successive periods of operation and inactivation with the attendant heating and cooling of the reactor.

Other objects of this invention are to provide a neutronic reactor having a thermal shield wherein the shield will be easy to construct, simple to assemble, structurally sound, low in cost, and occupy a minimum of space.

Another object of this invention is to provide a windowless radiation shield apparatus which permits the transverse passage of cooling tubes through the shield and is not unfavorably affected by alternated periods of intense heating and cooling.

These and other objects are obtained by the novel construction, materials and arrangement of materials hereinafter described and shown in the accompanying drawings, in which:

FIG. 3 is an elevational view of a section of thermal shield shown in FIG. 1;

FIG. 4 is a vertical sectional view of the thermal shield taken along line 4—4 of FIG. 3;

FIG. 5 is a plan view of a section of the shield shown in FIG. 3;

FIG. 6 is an isometric view of a thermal shielding block used on the sides or top of the reactor shown in FIG. 1; and FIG. 7 is an enlarged sectional view of a fragment of the active portion of the reactor shown in FIG. 1.

Figure 1:
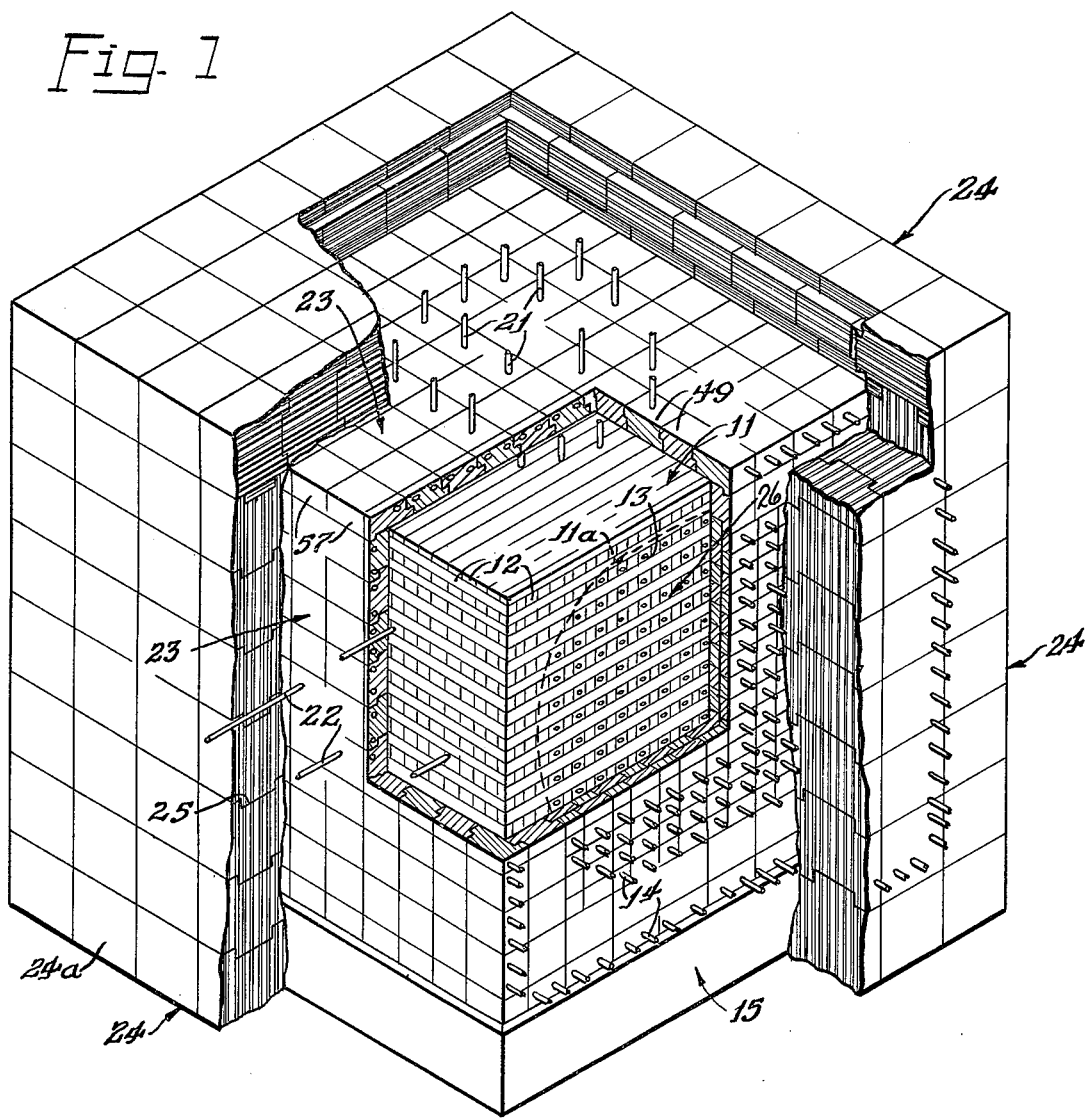
FIG. 1 is an isometric view of a neutronic reactor constructed according to the teachings of the present invention showing sections of the shield broken away to reveal the structure of the shield in its relationship to other parts of the reactor.

FIG. 1 shows a neutronic reactor with various portions cut away to reveal the inner structure. The innermost portion shown in FIG. 1 is a cylindrical region containing fissionable material called the active portion 11a. The active portion 11a is the core region of the cube 11 which is formed from a plurality of carbon graphite blocks 12. The carbon graphite blocks 12 taken as a whole constitute a moderator. The assembled blocks 12 are provided with channels 13 which pass through the reactor from the front face 15 to the rear face. The channels 13 accommodate a plurality of parallel horizontal cooling tubes 14 which also pass through the reactor from a front face, shown at 15, to a rear face on the opposite side of the reactor. The horizontal parallel cooling tubes 14 serve a dual function. First, they contain fuel elements of fuel slugs 16, shown in FIG. 6, in the form of uranium bodies 17 encased in protective metal jackets 18; and second, they provide channels through which cooling fluid is circulated through the reactor. The tubes 14 are constructed with two longitudinal ribs 19 which suspend the fuel slugs 16 in the center of the tubes 14, leaving an annular space 20 through which the coolant may pass. The dimensions of the tubes 14, their spacing, and the fuel slugs 16 will be set forth below for one construction of the present invention. It is to be understood that variations in the dimensions of the tubes and their spacing as set forth here would be necessary for adaption to a neutronic reactor using a different coolant, a different moderator material, or a different fissionable material.

The cooling tubes 14 is the reactor illustrated in the accompanying drawings are located on centers 8 and ⅜ inches apart, both in the horizontal and vertical directions. The outside diameter of the cooling tubes 14, which in the present instance are made of aluminum, is 1.729 inches, the average wall thickness are 0.059 inch, and the outside diameters of the fuel slug jackets 18 are 1.440 inches, thus leaving a mean annular space 20 for water flow 0.086 inch wide.

Referring again to FIG. 1, control rods 21 are shown protruding out of the top surface of the reactor. A plurality of shim rods 22 are shown protruding out of the side surface of the reactor. The shim rods are structurally similar to the control rods 21 except the shim rods are adapted to adjust the level of activity of the reactor in rather large steps, whereas the control rods 21 are adapted to control and regulate the reactor power level within a given step. By means of manipulating the control rods 21 and shim rods 22, the rate of the fission process within the reactor may be regulated within very narrow limits.

A thermal shield 23 is shown in FIG. 1 adjacent the graphite cube 11 and interposed between the graphite cube 11 and the outer biological shield 24. Both the thermal shield 23 and the biological shield 24 completely surround the graphite cube 11 of the reactor and together constitute the complete radiation shield about the nuclear reactor. The distinguishing characteristics of these two portions of a complete reactor shield will be presented below.

At least four kinds of radiation and subatomic particles may be found within an activated neutronic reactor which may be harmful to equipment or personnel in the vicinity of the reactor. These four kinds of harmful radiation and particles are designated as alpha particles, beta particles, gamma rays and neutrons. A satisfactory shielding device must control all four kinds of particles and radiation and ultimately absorb the particles and convert the incident radiation into easily controlled heat energy which may be readily transported away from the reactor. Alpha and beta particles, even those emanating from extremely high energy sources, do not have appreciable penetrating power. A few hundredths of an inch of any material will attenuate these or completely extinguish them. However, the same characteristic is not true of gamma rays and neutrons. These latter kinds of radiating photons and particles are extremely penetrating and generally masses of different material several feet thick arranged about the source with great ingenuity are required to control gamma and neutron particles. It is readily shown, therefore, that any device which is capable of attenuating and extinguishing gamma rays and neutrons is many times over a sufficient shield to control streams of alpha and beta particles. As a consequence, therefore, the present invention has been devised and described with attention directed solely to gamma rays and neutrons. It is to be understood that by so doing a total radiation shield has in fact been specified.

Adjacent to the active portion of a neutronic reactor in operation there is found a considerable intensity of gamma radiation generally concentrated in the 1 Mev to 5 Mev range, and in addition a high neutron flux with an energy distribution ranging from fast neutrons (greater than 10 Mev) to thermal neutrons. Accordingly, it is such gamma radiation and neutron flux which the shield disclosed herein is intended to treat.

A thermal shield must absorb and attenuate the gamma radiation and serve to scatter and thermalize the neutron flux, but above all it must withstand structurally the very intense heat cause by heat radiation out of the reactor and the heat generated in the absorbing structure itself by gamma incidence. A dense metal, stable under heating is most adaptable and iron is the most frequently selected element having these characteristics because of its excellent structural properties and low cost.

Figure 2:
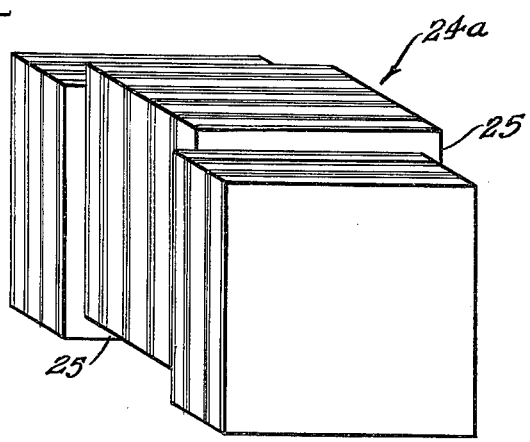
FIG. 2 is an enlarged isometric view of one of the biological or outer shield blocks shown in FIG. 1.

The outer or biological shield is a compromise between a light material which can completely thermalize the neutron flux and a dense material which can thermalize neutrons and extinguish gamma radiation. Laminated iron and masonite (a hydrogenous material prepared from wood pulp and a binder) are suitable materials. The hydrogenous material thermalizes the neutrons, the iron absorbs the thermal neutrons and gamma photons, and in addition gives the biological shield excellent structural properties. FIG. 2 illustrates in detail one of the iron and masonite biological shield blocks which form the biological shield 24 illustrated in FIG. 1. For convenience in construction, the biological shield is built up of blocks 24a, each with offset sections 25, such that no straight path is provided for the escape of radiation out of the reactor. A complete specification for a suitable biological shield is provided in the copending application of Charles W. J. Wende, Ser. No. 308,768, filed Apr. 17, 1953.

Table I shown below presents a comparison of the shielding properties of several materials commonly used in neutronic reactors.

From these remarks and the information contained in Table I above, it is manifest that no single element exhibits all the properties necessary for an ideal complete shield material. Similarly it is manifest that numerous combinations of substances would serve as a satisfactory shield material. However, when cost, structural properties, space limitations and other engineering considerations are introduced, combinations of different materials and particular geometrical arrangements of those materials are possible which possess distinct advantages for any particular application.

The present invention relates primarily to a portion 26 of the thermal shield 23 through which the cooling tubes 14 pass. A part of the shield portion 26 is shown in FIGS. 3, 4, and 5, which illustrate the shield portion 26 as provided with holes 27a, 27b, 27c. and 27d, through which the cooling tubes 14 (shown in FIG. 1, but not in FIGS. 3, 4, and 5) extend. In the preferred embodiment of FIGS. 3, 4, and 5, the shield portion 26 comprises two layers or courses of blocks 29 and 31; however, the person skilled in the art can readily adapt the principles of the invention to a plurality of courses numbering more than two. The embodiment of the invention illustrated in FIGS. 3, 4 and 5 is built up of four species of blocks. Two of these species are found in the outer course 29 and two are found in the inner course 31. The outer course species are designated as blocks 33 and 35. Block 33 has the same dimensions as block 35 except for width, wherein it is appreciably narrower. The tube holes 27a and 27b are centered on the vertical axis of symmetry as found on the face of each of these blocks 33 and 35. The horizontal positions of the tube holes 27a and 27b are above the horizontal plane passing through the center of gravity of the respective blocks and are centered on the same relative horizontal axis in all of the outer course 29, blocks 33 and 35. The precise horizontal location of the tube holes 27a and 27b will be made clearer below following description of the blocks in the inner course 31.

The inner course 31 is composed of two species of blocks 37 and 39 which are identical in all respects to one another except for one dimension, namely, the width of block 39 is appreciably less than that of block 37. However, the blocks 37 and 39 are identical in their over-all dimensions with the respective blocks 35 and 33 in the outer course 29 except that the tube holes 27c and 27d while being on the vertical axis of symmetry are located on a relatively lower horizontal axis with respect to the individual blocks in the inner course 31. This last characteristic is clearly illustrated in FIG. 4.

In all the four species of blocks 33, 35, 37 and 39, the tube holes 27a, 27b, 27c, and 27d have the same dimensions and longitudinal cross section which is again best illustrated by FIG. 4. A tapered counterbore 41 extends into each end of each block concentric with the tube hole axis. This counterbore provides for easier assembly of the thermal shield blocks onto the tubes 14 and it also allows for a slight angular adjustment longitudinally of the tubes for each individual block.

In all four species of the blocks 33, 35, 37 and 39, the tube holes 27a, 27b, 27c and 27d are centered on the vertical axis of symmetry as found on the front or rear face of the respective blocks, thus rendering all the blocks 33, 35, 37 and 39 laterally symmetrical. Further, in all the said blocks the tube holes 27a, 27b, 27c and 27d are centered on a horizontal axis parallel with the top and bottom surfaces of the respective blocks but always this axis is positioned above the horizontal plane passing through the center of gravity of each individual block. The said horizontal axes in the outer course 29, blocks 33 and 35, are located above the relative position of the said horizontal axes in blocks 37 and 39 found in the inner course 31. The relative distance from the horizontal axis upon which the tube holes 27a and 27b are centered in blocks 33 and 39 and the tube holes 27c and 27d in blocks 35 and 37, respectively, is equal to the vertical offset between adjacent blocks in the two courses 29 and 31. This relationship between the vertical offset of adjacent blocks in neighboring courses and the position of the tube holes 27a and 27c, and 27b and 27d, respectively, is clearly illustrated by FIG. 4.

Another characteristics of blocks 33, 35, 37 and 39 is that all edges 43 are rounded with small radii. In a shield block such rounded edges are unusual because it would normally allow a "window" or crevasse to develop at the interstices between the blocks. In the present instance, the novel relative sizes and assembly of the blocks into a unitary thermal shield prevents such "windows" from developing. The rounded edges serve a useful purpose, namely, they give a slight clearance for angular movements of the individual blocks, hence the blocks adjust individually to forces created by movement of the tubes 14 and by local thermal expansion and contraction of regions within the thermal shield 23.

Still another characteristic common to all the blocks 33, 35, 37 and 39 is the presence of a raised portion or boss 45 on each block centered about the tube holes 27 and located only on the sides of the blocks between the two courses 29 and 31. These raised portions 45 are shown clearly in FIGS. 4 and 5. These raised portions 45 are integral with the respective blocks and extend toward and contact the analogous raised portion 45 on the adjacent block in the adjoining course. This construction assures a gap or spring 47 between the courses of blocks 33, 35 and 37, 39. The space 47 is a thermal insulator between the courses. In a reactor operated for power generation, insulation to prevent wasteful dissipation of thermal energy is necessary to its successful operation. The raised portions 45 may assume a variety of shapes, however, a preferred form is characterized as a segment of a sphere. The segment is positioned symmetrically about the tube holes 27a, 27b, 27c or 27d, respectively, on each block. The spherical curve assures contact in a small region and thus provides only a small heat transfer area with the opposing spherical segment to be found on the adjacent block in the neighboring course, and it also assures an optimum void volume in the space 47 between the adjacent courses.

Certain clear advantages arise from mounting the blocks 33, 35, 37 and 39 on the cooling tubes 14 in the manner described immediately above. First, the lateral symmetry of the mounting above the horizontal plane of the center of gravity in each block assures a freedom of rotation to each individual block but further assures that each block will return to an orthogonal position with respect to adjacent blocks by reason of gravitational forces. Therefore, the individual blocks can readily adjust to rotational movement of the tubes 14. Secondly, the individual blocks can adjust to buckling of the tubes 14 by reason of the tapered counterbore 41 in the tube holes 27a, 27b, 27c and 27d, and third, they can adjust to axial movements of the tubes 14 by reason of the direct passage of the tubes through the blocks. It can be said that provision has been incorporated within the structure of these blocks to adjust to every conceivable degree of freedom of movement which the tubes 14 can exhibit. So far, the structure of the individual blocks has been described in detail, and within that structure provision for axial movement of the tubes 14, rotation about the respective axes of the tubes 14, and movements described as buckling of the tubes 14 which would be manifested by small changes in the angles between the longitudinal centers of the tubes. It remains at this point to elaborate upon the structure of the assembled blocks and the manner in which the blocks assembled into a unitary shield serve to adjust to horizontal and vertical translational movements of the tubes.

Referring now to FIGS. 3, 4 and 5, it is readily seen that the two courses 29 and 31 are formed by a series of horizontal rows or ranges which in turn are formed by aligning alternately one wide block 35 or 37 and one narrow block 33 or 39. The blocks in the ranges are so positioned that the narrow blocks 33 and 39 rest one above another in their respective courses, and the wide blocks 35 and 37 are positioned to rest one above another in their respective courses. The resulting structure when viewed as shown in FIG. 3 reveals horizontal rows or ranges composed of alternate wide and narrow blocks and vertical columns composed exclusively of one species of either the wide or the narrow blocks. The two courses 29 and 31 are symmetrical laterally and each column of blocks in each course is aligned symmetrically laterally with respect to the adjacent column in the neighboring course. The ranges within the two courses 29 and 31 are out of register vertically as shown in FIGS. 3 and 4. The vertical displacement between corresponding ranges within the two courses 29 and 31 is the same throughout the face of the shield. This above described assembly of the blocks 33, 35, 37 and 39 forms an essentially windowless shield which leaves to each individual cooling tube 14 a small degree of freedom to adjust to translational movements of the tube 14. The amount of adjustment allowed each block is limited to the space between the individual blocks after the shield is assembled. Accordingly the dimensions of the blocks 33, 35, 37 and 39 which have been found useful in a preferred embodiment of the invention will be specified below.

It was stated above that the cooling tubes 14 in a neutronic reactor were centered in both the horizontal and vertical directions on axes 8 ⅜ inches apart, and arranged in a rectangular pattern of equidistant rows and columns. Adaptation of the present invention to the reactor specified was accomplished by using blocks all of which are 5 inches thick and 8 3/16 inches high. The narrow blocks analogous to blocks 33 and 39 in FIG. 3 are 7 inches wide and the wide blocks analogous to blocks 35 and 37 are 9 ⅜ inches wide. From these dimensions one can readily deduce that a space of 3/32 of an inch is provided about the periphery of each block to allow for adjustment of the blocks to thermal stresses.

A preferred material for use in thermal shields such as described above is cast iron, although other dense material may be readily substituted for cast iron.

The top and side surfaces of the thermal shield 23 as shown in FIG. 1 are covered by a single layer of cast iron blocks 49 shown in FIG. 7. The block 49 is a side and top thermal shield block. It is a unitary block formed of two rectangular sections asymmetrically related so that they are offset on two axes. The side and top blocks 49 are provided with shield cooling tubes 51 in which coolant is circulated through the thermal shield to remove heat absorbed in the shield from the reactor core and to remove heat generated within the shield from gamma incidence. The tubes 51 are made necessary in the side and top blocks 49, but not in the front and rear face blocks 33, 35, 37 and 39 by the fact that the reactor cooling tubes 14 pass through the front and rear reactor faces but no such means for cooling the side and top blocks pass through or adjacent to them. The cooling tubes 51 are laid in channels 53 which form complete uninterrupted recesses in sides and top of the assembled thermal shield 23. The cooling tubes 51 are held in the channels 53 within the assembled shield by means of a soft metal binder 55, of which lead is an example. The molten binder is poured around the tubes 51 to form a heat transfer medium between the blocks 49 and the cooling tube 51. Such variations in the contours of the blocks 49 as are required to adapt them to installation on edges and corners of the shield as shown at 57 consist primarily of imposing a right angle turn in the mid-portion of the block.

The present invention may be readily adapted for use with any neutronic reactor having horizontal parallel coolant tubes which extend out of the reactor core and through the reactor shield. A disclosure of such a neutronic reactor having horizontal parallel coolant tubes which extend through the reactor shield is to be found in Fermi et al U.S. Pat. No. 2,708,656, FIG. 37, column 42, lines 64 et seq. Adaption of the invention disclosed herein to the reactor disclosed in the application of Fermi et al. will not substantially change the reactivity of the reactor as originally specified; accordingly engineering details of a reactor suitable for practice of the present invention are included in this application by reference only.

The intention is to limit the scope of the invention only to the appended claims.

What is claimed is:

1. The combination with a plurality of parallel horizontal members arranged in horizontal and vertical rows, the spacing of the members in all horizontal rows being equal throughout, the spacing of the members in all vertical rows being equal throughout; of a shield for a nuclear reactor comprising two layers of rectangular blocks through which the members pass generally perpendicularly to the layers, each block in each layer having for one of the members an opening equally spaced from vertical sides of the block and located closer to the top of the block than the bottom thereof, whereby gravity tends to make each block rotate about the associated member to a position in which the vertical sides of the block are truly vertical, the openings in all the blocks of one layer having one equal spacing from the tops of the blocks, the openings in all the blocks of the other layer having one equal spacing from the tops of the blocks, which spacing is different from the corresponding spacing in the said one layer, all the blocks of both layers having the same vertical dimension or length, the blocks of both layers consisting of relatively wide blocks and relatively narrow blocks, all the narrow blocks having the same horizontal dimension or width which is less than the horizontal dimension or width of the wide blocks, which is the same throughout, each layer consisting of vertical rows of narrow blocks and wide blocks alternating with one another, each vertical row of narrow blocks of each layer being covered by a vertical row of wide blocks of the other layer which wide blocks receive the same vertical row of members as the said each vertical row of narrow blocks, whereby the rectangular perimeters of each block of each layer is completely out of register with that of each block in the other layer.

* * * * *